US011217787B2

(12) United States Patent
Yamin et al.

(10) Patent No.: US 11,217,787 B2
(45) Date of Patent: Jan. 4, 2022

(54) LITHIUM CELLS AND METHODS OF MAKING AND USE THEREOF

(71) Applicant: Tadiran Batteries Ltd., Kiryat Ekron (IL)

(72) Inventors: Herzel Yamin, Ganei Yohanan (IL); Avi Ulus, Givatayim (IL); Onit Srur Lavi, Nes Ziona (IL); Chen Menachem, Holon (IL)

(73) Assignee: Tadiran Batteries Ltd., Kiryat Ekron (IL)

( * ) Notice: Subject to any disclaimer, the term of this patent is extended or adjusted under 35 U.S.C. 154(b) by 0 days.

(21) Appl. No.: 16/876,055

(22) Filed: May 17, 2020

(65) Prior Publication Data

US 2021/0359298 A1 Nov. 18, 2021

(51) Int. Cl.

| H01M 4/36 | (2006.01) |
| H01M 4/38 | (2006.01) |
| H01M 4/66 | (2006.01) |
| H01M 6/14 | (2006.01) |
| H01M 50/44 | (2021.01) |
| H01M 4/58 | (2010.01) |
| H01M 4/06 | (2006.01) |
| H01M 50/116 | (2021.01) |
| H01M 50/183 | (2021.01) |
| H01M 50/431 | (2021.01) |

(52) U.S. Cl.
CPC ............ *H01M 4/368* (2013.01); *H01M 4/06* (2013.01); *H01M 4/382* (2013.01); *H01M 4/582* (2013.01); *H01M 4/663* (2013.01); *H01M 6/14* (2013.01); *H01M 50/116* (2021.01); *H01M 50/183* (2021.01); *H01M 50/431* (2021.01); *H01M 50/44* (2021.01)

(58) Field of Classification Search
CPC ............ H01M 4/36; H01M 4/38; H01M 4/66; H01M 4/58; H01M 6/14
See application file for complete search history.

(56) References Cited

U.S. PATENT DOCUMENTS

| 3,463,673 A * | 8/1969 | Stroup ................ H01M 10/42 324/92 |
| 3,607,437 A * | 9/1971 | Minagawa ............ H01M 10/26 429/199 |
| 4,184,014 A * | 1/1980 | Dey ........................ H01M 6/14 429/105 |
| 4,378,414 A * | 3/1983 | Furukawa ............. H01M 10/24 429/144 |
| 2011/0052998 A1* | 3/2011 | Liang .................... H01M 4/136 429/300 |
| 2017/0338513 A1* | 11/2017 | Chiang ............... H01M 10/054 |

* cited by examiner

*Primary Examiner* — Kenneth J Douyette

(57) ABSTRACT

A primary electrochemical cell including a cell housing, an anode including metallic lithium, a liquid $SOCl_2$ cathode and a separator separating the anode from the cathode. The liquid $SOCl_2$ cathode material includes a salt of a Lewis base with a Lewis acid dissolved in the $SOCl_2$ to form an electrolyte solution and an amount of $SnCl_2$ dissolved in the electrolyte solution. The cell has a higher TMV and lower cell impedance after extended periods of cell storage at room or higher temperatures as compared to similar prior art primary $Li/SOCl_2$ cells that do not include the $SnCl_2$ additive.

14 Claims, 2 Drawing Sheets

LITHIUM CELLS AND METHODS OF MAKING AND USE THEREOF

FIELD AND BACKGROUND OF THE INVENTION

The present invention relates to the field of primary lithium electrochemical cells and more specifically but not exclusively to primary lithium thionyl chloride electrochemical cells.

Lithium thionyl chloride batteries are prior art primary batteries where Li metal is used as the negative electrode (Anode) and thionyl chloride ($SOCl_2$) is used as the cathode active material. Such cells include an electrolyte including a complex salt of a Lewis acid such as, for example, $AlCl_3$ (aluminum chloride) and a Lewis base such as, for example, lithium chloride (LiCl). The salts are dissolved in a solvent and the electrolyte solution conducts the electricity inside the cell during discharging of the cell. As described in U.S. Pat. No. 3,897,264 to Aubron, such prior art lithium-thionyl chloride batteries have very high practical energy density and possess a higher cell voltage than conventional manganese and alkaline batteries. The cells have excellent electrical characteristics at various ambient temperatures from less than −40° C. to 150° C. They have a very low self-discharge rate and a corresponding good shelf life exceeding twenty years of storage.

After the injection of the electrolyte to the lithium cell, the lithium anode becomes covered by a passivating layer called solid electrolyte interphase (SEI). As disclosed by E. Peled and H. Yamin, in a paper titled "Solid Electrolyte Interphase (SEI) Electrodes Part 1., The Kinetics of Lithium in LiAlCl4-SOCl2". published in Israel J. of Chem. 18, 131-135 (1979).

In primary lithium batteries the anode/electrolyte interphase affects the safety, the self discharge rate (and shelf life), the power capability, the low temperature performance, and the faradaic efficiency of the cell.

For optimum cell operation the SEI has to be a good ionic conductor to transfer the lithium ions that are formed during cell operation from the anode to the electrolyte. The SEI also has to possess low electronic conductivity to limit the reaction of the lithium with the solvent. During cell storage, the thickness of the SEI increases and the ionic conductivity through the SEI decreases resulting in an increase in the cell's internal resistance and a decrease in initial cell voltage during cell operation.

A well-known drawback of a prior art $Li/SOCl_2$ primary cells is the voltage delay. Reference is now made to FIG. 1, which is a schematic graph illustrating the voltage behavior as a function of time of a prior art $Li/SOCl_2$ primary cell after prolonged cell storage leading to severe passivation of the anodic lithium metal. The vertical axis of the graph represents the cell's voltage (in arbitrary units) and the horizontal axis of the graph represents time (in arbitrary units). The line 2 represents the cell's voltage as a function of time. During storage of the primary cell the cell's voltage is stable at the nominal open cell voltage (OCV) as indicated on the vertical axis. Time zero (0) on the horizontal axis represents the time of connecting a load to the cell terminals.

It is noted that in freshly manufactured cells, the voltage delay is much less severe and there may actually be a less substantial drop (or even no substantial drop) in the cell's voltage than that shown in FIG. 1. However, during prolonged storage periods of the primary cell at room temperature or at elevated temperatures, the voltage delay may become more severe, and the initial drop in cell voltage may be more prominent. This voltage drop may be a problem as it limits the initial voltage developed by the cell to below a predetermined minimum cut off voltage required to operate.

During the initial stage of cell operation (starting at time zero in the graph), the operating voltage of the lithium thionyl chloride batteries gradually drops to a certain minimum value (indicated as TMV on the vertical axis of the graph) and gradually recovers later on. The time required to reach a given minimum voltage is known as the delay time and the minimum voltage reached by the cell under load is known as a transition minimum voltage (TMV). Several research groups and manufactures worldwide have attempted to overcome the TMV problem by increasing the minimum voltage and shortening or eliminating the delay time to a given voltage.

U.S. Pat. No. 3,993,501 to Kalnoki-kis discloses a non-aqueous cell employing active metal in conjunction with an oxyhalide cathode, wherein the active metal is coated with a vinyl polymer film that substantially prevents passivation of the anode.

In U.S. Pat. No. 4,355,086 to Venkatasetty et al. it is disclosed how the inventors were able to reduce the internal cell resistance by about 10% by the addition of an amount of a mixture containing $AlCl_3$ and butyl pyridinium chloride to the cell's electrolyte solution, improving mainly the cell's discharge results but barely affecting the delay voltage.

U.S. Pat. No. 4,714,664 to Laustsen et al. disclosed adding sulfur trioxide ($SO_3$) to the electrolyte solution using either $LiSO_3Cl$ or $SO_3$ to improve TMV. However, the cells taught by Laustsen et al. still exhibited low voltage values after being exposed to a temperature 45° C. for only two weeks.

U.S. Pat. No. 4,608,753 to Fleischer disclosed adding alkyl 2 cyanoacrylates and acrylic ester polymers to the cell's electrolyte solution which reduced the voltage delay in lithium thionyl chloride cells, but only for the short term. Significant voltage degradation occurred when such cells were exposed to high ambient temperatures around 70° C.

SUMMARY OF THE INVENTION

There is therefore provided, in accordance with some embodiments of the cells of the present application a primary electrochemical cell. The cell includes a cell housing, an anode including metallic lithium disposed within the housing, a cathode disposed within the housing, the cathode includes a current collector including a porous carbonaceous material. The cathode also includes an $SOCl_2$ liquid cathode material, a salt of a Lewis base with a Lewis acid dissolved in the $SOCl_2$ to form an electrolyte solution, and an amount of $SnCl_2$ additive dissolved in the electrolyte solution. The cell also includes a separator separating the anode from the cathode.

In accordance with some embodiments of the cells of the present application, the porous carbonaceous material is selected from, porous acetylene black bonded by PTFE, graphite bonded by PTFE, high surface area carbon like black pearl 2000 bonded by PTFE, and any combinations thereof.

In accordance with some embodiments of the cells of the present application, the salt of the Lewis base and the Lewis acid is selected from LiAlCl4 or $LiGaCl_4$, or any combinations thereof In accordance with some embodiments of the cells of the present application, the concentration of the salt of the Lewis base with the Lewis acid is in the range of 0.4-1.8M.

In accordance with some embodiments of the cells of the present application, the separator is a glass fiber separator.

In accordance with some embodiments of the cells of the present application, the housing is a hermetically sealable stainless steel housing or a nickel plated steel housing.

In accordance with some embodiments of the cells of the present application, the amount of the $SnCl_2$ additive is in the range of 0.5-5.0 grams of $SnCl_2$ per liter of electrolyte solution.

In accordance with some embodiments of the cells of the present application, the cell type is selected from a bobbin type cell, a button type cell, a prismatic cell, a spiral cell, a wafer type cell, a coin type cell, an ER14500 cell, a ER33600 cell, an AA size cell, a C type cell and a D type cell.

In accordance with some embodiments of the cells of the present application, one or more electrical parameters of the cell exhibit an improvement as compared to the respective one or more electrical parameters of a similar primary cell that does not include the $SnCl_2$ additive.

In accordance with some embodiments of the cells of the present application, the improvement is:

increasing the transient minimum voltage (TMV) of the primary cell at a pulse current of C/60 by 10% or higher as compared to a similar primary cell not including the $SnCl_2$ additive or decreasing the cell's AC impedance measured at 1 KHz at a temperature of 21° C. by 20% or higher as compared to a primary cell not including the $SnCl_2$ additive or exhibiting less than 60% increase in the cell's AC impedance measured at 1 KHz after cell storage of 332 days at 21° C. or increasing the electrical charge capacity of the cell by at least 10% as compared to a primary cell not including the $SnCl_2$ additive, wherein the charge capacity is determined by discharging the cell at a current of 20 mA to a cutoff voltage of 2.0 volts or any non-mutually exclusive combinations of the above improvements.

There is also provided, in accordance with some embodiments of the methods of the present application, a method for improving the electrical performance of a primary lithium thionyl chloride cell including a metallic lithium anode, a cathode including a cathode current collector including a porous carbonaceous material, an electrolyte dissolved in the thionyl chloride to form an electrolyte solution. The method includes the step of adding to the electrolyte solution an amount of $SnCl_2$ prior to introducing the electrolyte solution into the cell, to improve at least one electrical parameter of the primary cell.

In accordance with some embodiments of the method, the porous carbonaceous material is selected from, porous acetylene black bonded by PTFE or graphite bonded by PTFE, or high surface area carbon like black pearl 2000 bonded by PTFE or any combinations thereof.

In accordance with some embodiments of the method, the electrolyte is $LiAlCl_4$ or $LiGaCl_4$ or any combinations thereof.

In accordance with some embodiments of the method, the concentration of the electrolyte in the thionyl chloride is in the range of 0.4-1.8M.

In accordance with some embodiments of the method, the concentration of $SnCl_2$ in the electrolyte solution is in the range of 0.5-5.0 gram per liter of electrolyte solution.

In accordance with some embodiments of the method, the improving of at least one electrical parameter of the primary cell is, increasing the transient minimum voltage (TMV) of the primary cell at a pulse current of C/60 or higher by 10% or higher as compared to a similar primary cell not including the $SnCl_2$ additive, or decreasing the cell's AC impedance measured at 1 KHz at a temperature of 21° C. by 20% or higher as compared to a primary cell not including the $SnCl_2$ additive, exhibiting less than 60% increase in the cell's AC impedance measured at 1 KHz after cell storage of 332 days at a temperature of 21° C., or increasing the electrical discharge capacity of the cell by at least 10% as compared to a primary cell not including the $SnCl_2$ additive, wherein the charge capacity is determined by discharging the cell at a current of 20 mA to a cutoff voltage of 2.0 volts, or any non-mutually exclusive combinations thereof.

There is also provided, in accordance with some embodiments of the methods of the present application, a method of constructing a primary cell. The method includes the steps of:

1. Providing a cell housing including a metallic can and a metallic cell cover. The cell cover includes a positive terminal electrically isolated from the metallic cover by a glass/metal seal.

2. Providing an anode including metallic lithium.

3. Providing a liquid cathode material including $SOCl_2$, a salt of a Lewis base with a Lewis acid dissolved in the $SOCl_2$ to form an electrolyte solution, and an amount of $SnCl_2$ additive dissolved in the electrolyte solution.

4. Providing a cathode current collector including a porous carbonaceous material.

5. Providing a separator.

6. Inserting the lithium metal, the separator and the current collector into the can such that the separator electrically separates the metallic lithium and the metallic can from the current collector.

7. Inserting the positive terminal into the can such that the positive terminal or part thereof is in contact with the current collector.

8. Welding the metallic cover to the metallic can.

9. Filling the housing with the liquid cathode material.

10. Hermetically sealing the housing.

In accordance with some embodiments of the method, the step of filling includes introducing the liquid cathode material into the housing through a hole formed in the can prior to the step of hermetically sealing the housing.

In accordance with some embodiments of the method, steps 1-5 above are performed in the order specified above.

In accordance with some embodiments of the method, at least the steps 6-10 above are performed in an atmosphere comprising dry air.

BRIEF DESCRIPTION OF THE SEVERAL VIEWS OF THE DRAWINGS

Some embodiments of the invention are herein described, by way of example only, with reference to the accompanying drawings, in which like components are designated by like reference numerals. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF SPECIFIC EMBODIMENTS OF THE INVENTION

Abbreviations

Figure 1:
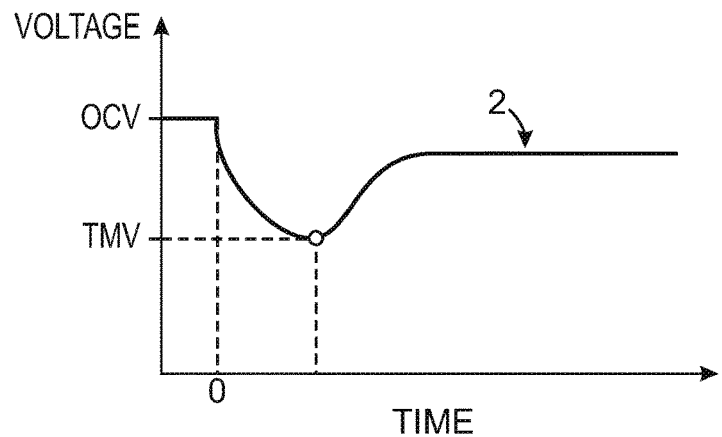
FIG. 1 is a schematic graph illustrating the voltage behavior as a function of time of a prior art Li/SOCl$_2$ primary cell.

The following abbreviations are used throughout the present application:

| Abbreviation | Meaning |
| --- | --- |
| μm | micrometer |
| AC | Alternating current |
| cm | centimeter |
| cm$^2$ | Square centimeter |
| EMF | Electromotive force |
| Ga | Gallium |
| gr | gram |
| Hz | Hertz |
| ICP | Inductively coupled plasma |
| Kg | Kilogram |
| KHz | Kilohertz |
| L | Liter |
| Li | Metallic lithium |
| Li+ | Lithium ion |
| mA | milliampere |
| Ah | Ampere hour |
| mAh/g | Milliampere hour per gram |
| mm | millimeter |
| msec | Millisecond |
| M | Molar |
| OCV | Open Cell Voltage |
| PTFE | Polytetrafluoroethylene |
| SEI | Solid electrolyte interphase |
| TMV | Transient minimum voltage |
| Teflon ® (PTFE) | Polytetrafluoroethylene |
| V | Volt |
| Wh | Watt hour |

The present application discloses a novel type of a primary lithium thionyl battery having an inorganic salt (SnCl$_2$) additive included in its liquid electrolyte solution. The additive upgrades the operating voltage during the initial step of operation. The battery has an excellent voltage performance and improved cell operating voltage. The cell's voltage drop is significantly reduced by improving (increasing) the value of the transient minimum voltage (TMV) as compared to a prior art primary lithium thionyl chloride cell that does not include the SnCl$_2$ additive. This improvement was observed at room temperature after very long storage (about 1 year) as well as after long storage (6 months) at high temperature of 72° C., without increasing the cell's self-discharge.

The cells of the present invention also exhibit a substantial reduction of the cell's AC impedance, as compared to prior art primary Li/SOCl$_2$ cells. This advantageously improves the cell's ability to deliver higher currents as compared to prior art primary Li/SOCl$_2$ cells, even after long storage time periods.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways. It is expected that during the life of a patent maturing from this application many relevant electrochemically suitable solid cathodes will be developed and the scope of the terms "solid cathode" and "solid cathode material" are intended to include all such new technologies a priori. As used herein the term "about" refers to ±10%. The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments unless the embodiment is inoperative without those elements.

The chemicals described in the examples below were lithium battery grade materials obtained from Bayer, Germany, from American Elements, USA and from Foot Mineral Corporation(FMC), USA.

Various embodiments and aspects of the present invention as delineated hereinabove and as claimed in the claims section below find experimental support in the following examples.

The primary lithium thionyl electrochemical cell of the present invention include a metallic lithium anode, a high surface area porous PTFE bonded carbon functioning as a cathode current collector and a fiberglass separator separating the anode from the porous cathode current collector. A metallic, stainless steel current collector is electrically connected to the carbon porous collector to conduct the electricity. The cell also includes a non-aqueous electrolyte solution in contact with the cell's anode and the cell's cathode current collector. The electrolyte solution has a dual role. The electrolyte solution conducts electricity inside the cell and also functions as the cathodic active material. In addition, the electrolyte solution of the present invention includes $SnCl_2$ as an additive that reduces the voltage delay of the cell and substantially improves the transition minimum voltage (TMV) of the cell.

When the electrolyte solution is inserted into the cell, reaction of $SOCl_2$ with lithium metal occurs due to the high electromotive force (EMF) of 3.67 V between lithium and the thionyl chloride solvent. This reaction forms a solid electrolyte interphase (SEI) layer on the surface of the lithium anode. The SEI consists mainly of lithium chloride (LiCl) crystals. This SEI layer starts to hinder further reaction of $SOCl_2$ with the anodic metallic lithium giving a preference to the reaction of the $SnCl_2$ additive with lithium metal resulting in deposition of metallic Sn on the surface of the lithium anode due to electrochemical EMF of 2.91V between the lithium and $SnCl_2$.

The concentration of the $Sn^{+2}$ ions in the electrolyte solution is small in comparison to the high concentration of $SOCl_2$, However, the $Sn^{+2}$ ions keep penetrating through the SEI. Thus, several hours after filling of the cell with the electrolyte solution, most $Sn^{+2}$ ions disappear from the electrolyte solution and are deposited on the cell's anode as metallic tin (Sn). This finding was confirmed by quantitative determination of tin by ICP spectroscopy measurements of the cell electrolyte solution and by quantitative determination of Sn contained in the lithium anode by ICP determination after dissolving cell's anode in distilled water. It seems that after formation of metallic Sn at the anode, a spontaneous lithiation of the deposited Sn starts to occur. At this stage the reaction of $SOCl_2$ with the lithiated Sn anodic deposit leads to formation of a SEI on the surface of the lithiated tin.

When the impedance of the cells of the present invention (containing the $SnCl_2$ additive) was compared to the impedance of a standard prior art $Li/SOCl_2$ cell using AC impedance spectroscopy, the cells containing the $SnCl_2$—additive exhibited at least half an order of magnitude—lowering of the cell's impedance as compared to the prior art $Li/SOCl_2$ cells. This reduction in cell's impedance may probably result from an increase in the structural defects of the LiCl SEI layer in the presence of the $SnCl_2$ additive.

Two types of experimental primary lithium cells were constructed: a) Standard size AA cell and b) Standard size D cell.

Construction of the AA Sized Primary Cell

Figure 2:
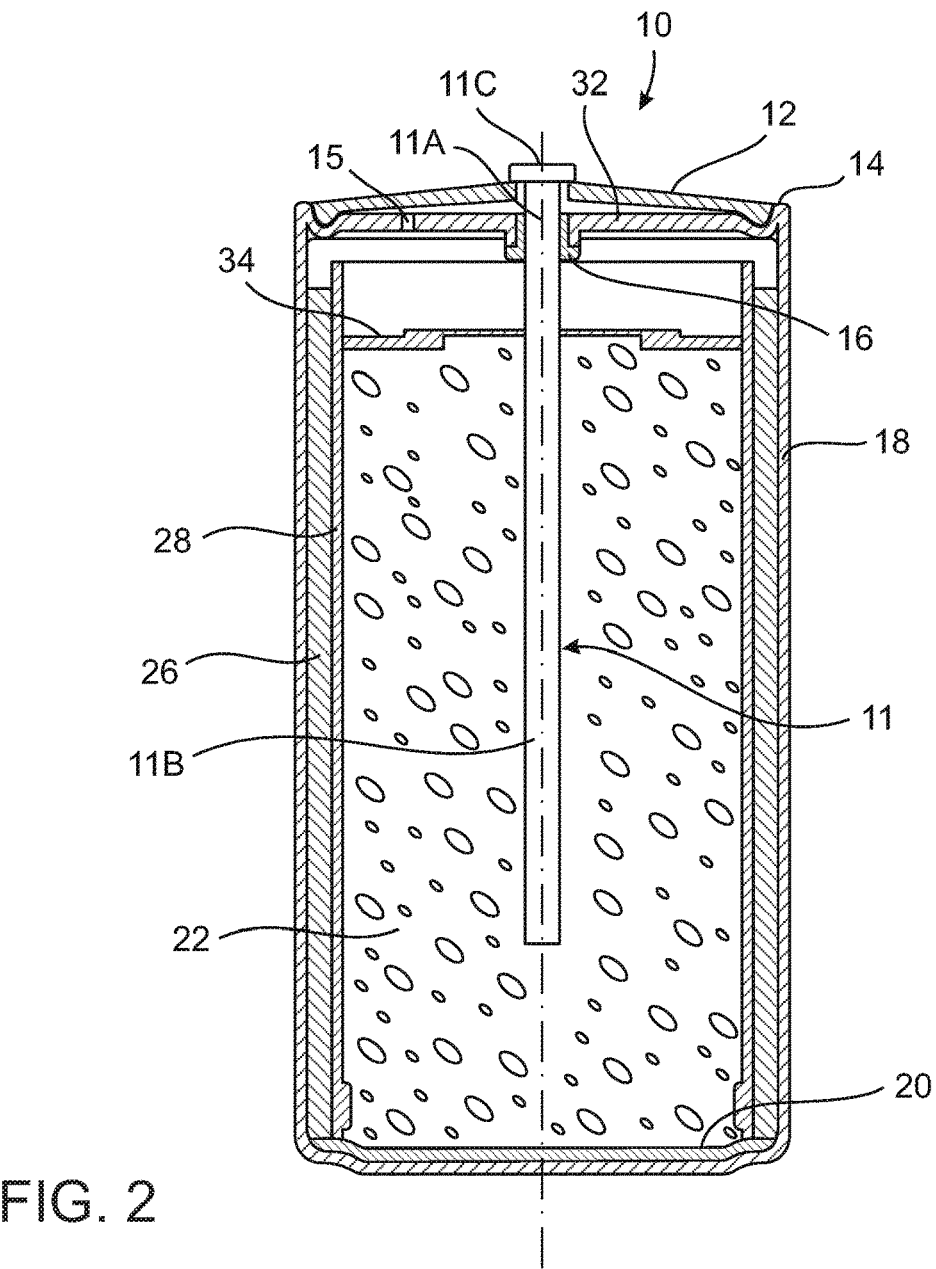
FIG. 2 is a schematic diagram illustrating the structure of a bobbin type AA size primary Li/SOCl$_2$ cell, in accordance with some embodiments of the cells of the present invention.

Reference is now made to FIG. 2 which is a schematic diagram illustrating the structure of a bobbin type AA size primary $Li/SOCl_2$ cell, in accordance with some embodiments of the cells of the present invention. The cell 10 has a lithium metal anode 26 that is swaged against a nickel-plated steel can 18. A cathodic current collector 22 made of porous PTFE bonded acetylene black occupies most of the volume of the can 18. A glass fiber separator 28 is inserted between the lithium anode 26 and the cathodic current collector 22. A bottom glass fiber separator 20 is disposed at the bottom of the can 18 to separating the can 18 from the cathodic current collector 22. A top glass fiber separator 34 is disposed above the current collector 22 to prevent contact of the current collector 22 with the cell cover 32. The cell's cover 32 is made from nickel plated steel and includes a positive terminal 11 made from "Alloy 52" and a glass to metal seal 16. "Alloy 52" is a nickel-iron based alloy containing about 50.5% of Ni and about 48% of Fe and other materials like Si, C, Mn and others, to balance the alloy to 100%. This alloy is suitable for forming glass/metal sealings. The positive terminal 11 includes an external positive terminal portion 11A extending out of the glass/metal seal 16 and ending in a third terminal portion 11C. The positive terminal 11 includes an internal terminal portion 11B extending into the cell 10. The internal terminal portion 11B is in mechanical and electrical contact with the porous carbon current collector 22. The metal can 18 is welded to the cover 32 by laser seam welding to form a welded seam 14. An electrically non-conducting polymer washer 12 is disposed between the cell cover 32 and the third terminal portion 11C.

The Cell cover 32 includes a small opening 15. The liquid cathode electrolyte solution is injected into the cell 10 through the opening 15 followed by sealing of the opening 15 by a stainless steel ball (not shown, for the sake of clarity of illustration) and resistance welding of the ball (not shown) to hermetically seal the cell 10. After filling of the cell with the liquid cathode electrolyte solution, the solution is in contact with the carbon current collector 22, and the lithium anode 26 and also permeates the glass fiber separators 20, 28 and 34.

The liquid cathode electrolyte solution is composed of LiCl and $AlCl_3$ in 1:1 molecular ratio to form the complex salt $LiAlCl_4$ that conducts the electricity inside the cell. Typically, in commercially available $Li/SOCl_2$ primary cells, the concentration of $LiAlCl_4$ used is in the range of about 0.6-1.35M. In all of the experiments described below, the concentration of $LiAlCl_4$ in the $SOCl_2$ was 1.2M.

Construction of the D Size Primary Cell

Figure 3:
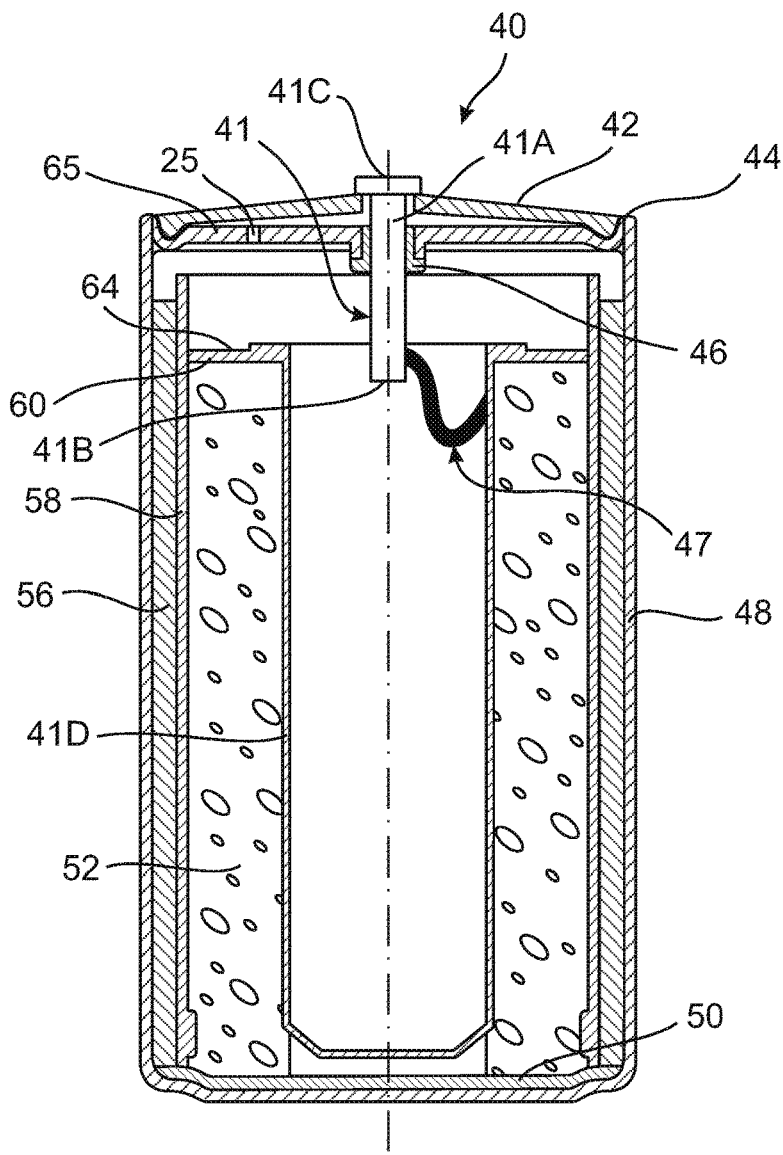
FIG. 3 is a schematic diagram illustrating the structure of a D size primary Li/SOCl$_2$ cell, in accordance with some embodiments of the cells of the present invention.

Reference is now made to FIG. 3 which is a schematic diagram illustrating a conventional (prior art) D size primary $Li/SOCl_2$ cell.

The cell 40 includes a lithium metal anode 56 that is swaged against a nickel plated steel can 48. A cathodic current collector 52 made of porous PTFE bonded acetylene black occupies most of the volume of the can 48. A glass fiber separator 58 is disposed between the lithium anode 56 and the cathodic current collector 52. A bottom glass fiber separator 50 is disposed at the bottom of the can 48 separating the bottom of the can 48 from the cathodic current collector 52. A top glass fiber separator 64 is disposed above the current collector 52 to prevent contact of current collector 52 with cell cover 65.

The cell cover 65 includes a positive terminal 41 made from "Alloy 52" (described in detail above). The positive terminal 41 has an external portion 41A ending in a third terminal portion 41C and an internal portion 41B. The positive terminal 41 extends into the can 48 by passing through a glass/metal seal 46. A metallic cylinder 41D made from stainless steel is welded to a nickel tab 47. The nickel tab 47 is also welded to the internal portion 41B of the external portion 41A of the positive terminal 41, such that the metallic cylinder 41D is electrically connected to the positive terminal 41A and to the third portion 41C. The metallic cylinder 41D is in mechanical (and electrical) contact with the porous carbon current collector 52. The cell cover 65 is shaped as an annular metallic part. The positive terminal 41 passes through the cover 65 into the cell 40 and is electrically isolated from the cell cover 65 by a glass/metal seal 46.

The positive terminal 41 sealingly passes through the glass/metal seal 46. The metal can 48 is welded to the cell cover 65 by laser seam welding to form a welded seam 44. An electrically non-conducting polymer washer 42 is disposed between the cell over 65 and the third terminal portion 41C.

The liquid cathode electrolyte solution (in $SOCl_2$) is injected into the cell 40 through a small opening 25 in cell cover, followed by sealing of the opening 25 by a stainless steel ball (not shown, for the sake of clarity of illustration) and resistance welding to hermetically seal the cell 40.

Reference is now made to the following examples, which together with the above descriptions illustrate some embodiments of the invention in a non-limiting fashion.

Example 1 (Control Cell)

An AA size cell was constructed as described hereinabove with respect to FIG. 2. The cell was filled with an electrolyte solution of 1.2M $LiAlCl_4$ in $SOCl_2$. This cell represents the control (prior art) lithium thionyl primary cell. The cell was stored at room temperature. AC impedance measurements at different cell storage times were performed at a frequency of 1000 Hz.

Example 2 (Cell with $SnCl_2$ Additive)

An AA size cell was constructed as described in Example 1. The cell was filled with an electrolyte solution of 1.2M $LiAlCl_4$ in $SOCl_2$ containing the additive $SnCl_2$ at a concentration of 2 gr/L of the $LiAlCl_4$ solution in $SOCl_2$. AC impedance measurements at different cell storage time were performed at a frequency of 1000 hertz. The cell was stored at room temperature (about 21° C.) for 6 months and the cell's AC impedance was tested at various storage times at room temperature.

The impedance of both cells of Example 1 and Example 2 as a function of storage time is given in table 1 below.

TABLE 1

| Storage Time At room Temperature (Days) | Control cell impedance (ohm) | Test cell (with $SnCl_2$) impedance (ohm) | Impedance reduction of test cell as compared to control cell (%) |
|---|---|---|---|
| 1 | 5.7 | 3.6 | 37 |
| 6 | 6.3 | 3.9 | 38 |
| 20 | 8.8 | 4.1 | 53 |
| 57 | 10.1 | 4.3 | 57 |
| 80 | 10.9 | 4.6 | 57 |
| 134 | 13.8 | 4.9 | 64 |
| 254 | 16.1 | 5.1 | 68 |

From Table 1 it may be seen that the impedance of both cells of example 1 and example 2 increased with time. However, the impedance of the cell of example 2 (with the $SnCl_2$ additive) is significantly lower than the impedance of the control cell for all the tested cell storage times. At the shortest tested storage time of 1 day the impedance of the test cell was reduced by about 37% as compared the impedance of the control cell. At the longest tested storage time of 254 days the impedance of the test cell is reduced by 68% as compared to the control cell. Thus, the % reduction of the test cell's impedance relative to the impedance of the corresponding control cells keeps improving (a lower cell impedance is better than a higher cell impedance as it allows higher currents to flow through the cell during the cell's operation for a given cell voltage) along the entire tested period of storage at room temperature. It may be seen that the test cell's impedance (5.1 ohm) at 254 days of storage is actually smaller than the control cell's impedance (5.7 ohm) after one day of storage.

Example 3

Two D size cells in accordance with FIG. 3 were assembled and filled with electrolyte solution (control cell) and with an electrolyte solution with the $SnCl_2$ additive (test cell) as described hereinabove for examples 1 and 2, respectively (except that the cells of example 3 were D size and not AA size as in examples 1 and 2). AC impedance measurements versus storage time at room temperature (about 21° C.) was recorded for the control cell and the test cell. The impedance measured at a frequency of 1000 hertz increases with time as shown in Table 2 below.

TABLE 2

| Storage time at 21° C. (days) | Impedance of control cell (ohm) | Impedance of test cell (ohm) | Impedance reduction of test cell as compared to control cell (%) |
|---|---|---|---|
| 1 | 1.70 | 1.23 | 27.6 |
| 7 | 3.52 | 1.61 | 54.3 |
| 17 | 4.90 | 1.74 | 64.5 |
| 55 | 6.63 | 1.79 | 73.0 |
| 108 | 6.86 | 1.82 | 73.5 |
| 164 | 7.25 | 1.88 | 74.0 |
| 185 | 8.33 | 1.89 | 77.3 |
| 332 | 11.2 | 1.91 | 82.9 |

A high rate of increase in the D sized cell's impedance in the first few days of storage was observed, followed by a slower increase of the cell's impedance later on. As may be seen from Table 2 above, a relatively stable value of about 11.2 ohm and 1.90 ohm was obtained after about 6 to 11 months of storage (at room temperature) for the control cell and for the test cell, respectively. At a storage time of 1 day, the impedance of the test cell was about 72% of the impedance of the control cell, and at a storage time of 332 days, the impedance of the test cell is about 17% of the impedance of the control cell. Thus, the impedance of the test cell steadily improves (is reduced) as compared to the impedance of the control cell during the entire tested storage period of 332 days.

Figure 4:
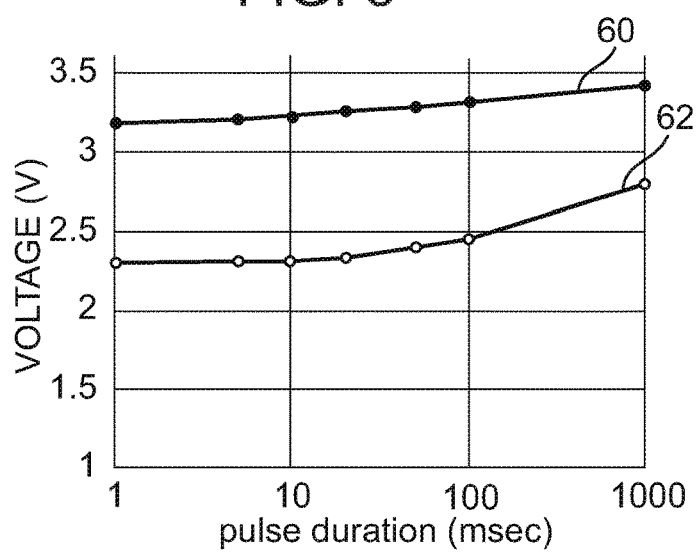
FIG. 4 is a schematic graph illustrating the value of the voltage of a control cell and of a test cell with an SnCl$_2$ additive during specific times within a 1 second 100 mA current pulse measured at room temperature after storing the control and the test cells for 6 months at room temperature (of about 21° C.).

Reference is now made to FIG. 4 which is a schematic graph illustrating the value of the voltage of a control cell and of a test cell with an $SnCl_2$ additive during specific times within a 1 second 100 mA current pulse measured at room temperature after storing the control and the test cells for 6 months at room (of about 21° C.). The increase in the value of the cell voltage during the discharging current pulse may probably be attributed to the increase in the ionic species inside the SEI layer during the pulse.

The initial cell voltage as a function of time from the initiation of the current pulse, was studied by using a 1 second 100 mA pulse for the control cell and for the test cell. After 6 month of storage the minimum initial voltage of the control cell and the test cell was 2.35 volt and 3.25 volt, respectively. The voltage as tested during a 100 mA current pulse increases with the pulse duration for the control cell as well as for test cell. For the control cell the initial voltage starts from 2.35V at a time of 1.0 msec and reached 2.8V at the end of the current pulse while for the test cell the voltage starts at 3.20 volt at 1.0 msec and reached a value of 3.45 volt after 1 second. As stated hereinabove, the voltage increase during the transient may be attributed to the increase in the ionic species (mainly Li+) inside the SEI layer during the pulse.

Example 4

Four different D size cells (cells 1/4, 2/4, 3/4, and 4/4) similar to the cell of example 3 were manufactured except that the electrolyte solution contained the following $SnCl_2$ concentrations (in grams of $SnCl_2$ per liter of 1.2M $LiAlCl_4$ solution in $SOCl_2$): for cell 1/4 the $SnCl_2$ concentration was 2.0 gr/L of electrolyte solution; for cell 2/4 the $SnCl_2$ concentration was 1.0 gr/L of electrolyte solution; for cell 3/4 the $SnCl_2$ concentration was 0.5 gr/L of electrolyte solution; and for cell 4/4 the $SnCl_2$ concentration was zero (0.0 gr/L) of electrolyte solution (No additive, Control cell). AC impedance after 6 month of storage (At room temperature of about 21° C.) was found to be five times smaller than the control cell for 2 gram $SnCl_2$ per liter and three times smaller for the $SnCl_2$ additive concentration of 1.0 gr/liter.

Table 3 lists the measured cells' AC impedance at 1 KHz and the measured transient minimum voltage (TMV) during a 1.0 second, 100 mA current pulse after 6 months of storage at room temperature for cells 1/4, 2/4, 3/4 and 4/4.

TABLE 3

|  | Cell 1/4 | Cell 2/4 | Cell 3/4 | Cell 4/4 |
| --- | --- | --- | --- | --- |
| $SnCl_2$ concentration (gr/L of electrolyte solution) | 2 | 1 | 0.5 | 0.0 |
| Cell AC impedance measured at 1000 Hz (ohm) | 1.60 | 2.65 | 5.50 | 8.40 |
| TMV at 100 mA one second pulse (V) | 3.18 | 2.81 | 2.68 | 2.33 |

As may be seen from the values in table 3, the cell impedance and the minimum transient voltage were markedly improved for the test cells 1/4, 2/4, and 3/4 in comparison to the control cell (cell 4/4). The level of the improvement (a reduction in AC impedance value and an increase of cell's TMV value) increases with increasing concentrations of the $SnCl_2$ additive in the electrolyte solution. At 2.0 gr/L $SnCl_2$ the TMV value is approximately 36% higher than the TMV of the control cell. At 1.0 gr/L $SnCl_2$ the TMV value is approximately 20.6% higher than the TMV of the control cell and at 0.5 gr/L $SnCl_2$ the TMV value is approximately 15% higher than the TMV of the control cell. Concentrations of $SnCl_2$ higher than 2.0 gr/L were not tested in this experiment, but it is possible that even further increases in the TMV are reachable at concentrations higher than 2.0 gr/L $SnCl_2$. Such concentrations (higher than 2.0 gr/L of electrolyte solution) may also be used in the cells of the present invention, however, the high cost of $SnCl_2$ may require considering the total manufacturing cost of the cell compared to the achievable improvement in the resulting cell's electrical properties.

Example 5

Three cells similar to the cell of example 2 above were fabricated. At the time of filling of the cells, the electrolyte solution of all cells included 2.0 gr/L of $SnCl_2$ dissolved in a solution of 1.2M $LiAlCl_4$ in $SOCl_2$. After storage at room temperature for different time periods the cells were cut open and the electrolyte composition was analyzed by ICP. After 30 minutes, 4 hours and 8 hours of storage at room temperature, only 30%, 5% and 0.2% of the initial tin (Sn) values were found to remain in the electrolyte solution, respectively.

Example 6 (Control Cell)

An AA cell was assembled in accordance with example 1. The cell was discharged at a constant current of 20 mA to a 2.0 V cutoff. After 109 hours of continuous discharge the cell voltage reached the 2.0V cutoff. The calculated electrical capacity of the cell of Example 6 was 2.18 Ah Example 7 (Test Cell)

An AA cell was assembled in accordance with example 2. The cell was discharged at a constant current of 20 mA to a 2.0 V cutoff. After 122 hours of continuous discharge, cell voltage reached the 2.0V cutoff. The calculated cell capacity of the cell of Example 7 was 2.42 Ah.

The comparison of the cell's capacity of example 6 and example 7 clearly indicates that the addition of $SnCl_2$ to the electrolyte solution not only improves the cell's TMV (as seen in Table 3) but also results in an increase of about 11% in the cell's capacity as well under the test conditions.

The discharge capacity of primary $Li/SOCl_2$ cells is rate limited. At a high discharge rate, the anode and the cathode can take part in limiting the discharge capacity of the cell. At a lower discharge current of 2 mA or lower both cells (the control cell and the cell with the $SnCl_2$ additive of example 1 and example 2) deliver about the same capacity of 2.45 Ah. The capacity improvement at the higher current of 20 mA may probably result from to the higher conductivity of the anode SEI layer that improves the homogeneity of the lithium consumption during the discharge.

Example 8

An AA sized control cell as per example 1 and an AA sized test cell that contains the $SnCl_2$ additive in the electrolyte solution as per example 2 were constructed. The cells were stored in an oven at 72° C. For testing the AC impedance and the TMV, the cells were brought to room temperature (about 21° C.), tested and returned to the oven at 72° C. for further storage. The AC impedance at 1000 Hz of the control and test cells was measured at different storage times periods and the TMV of both control and test cells was measured using a current pulse of 30 mA and a duration of 100 msec for the same storage time periods.

Table 4 below describes the measured cell impedance for different storage times at 72° C. for the control cell and for the test cell.

TABLE 4

| Storage Time at 72° C. (Days) | Control cell impedance (ohm) | Test cell impedance (ohm) | Impedance reduction of test cell as compared to control cell (%) |
|---|---|---|---|
| 3 | 9.2 | 4.4 | 52.2 |
| 7 | 11.5 | 4.7 | 59.1 |
| 14 | 13.8 | 5.1 | 63.0 |
| 30 | 17.4 | 6.6 | 62.1 |
| 60 | 28.3 | 10.5 | 62.9 |
| 183 | 42.2 | 15.8 | 62.6 |

From table 4 it may be seen that the test cell exhibited an impedance that was reduced by about 52% to 62% of the impedance of the control cell over the tested storage period of 3-183 days at 72° C. The % reduction in cell impedance seemed to stabilize after about 30 days of storage at 72° C.

Table 5 below describes the measured TMV for different storage times at 72° C. for the control cell and for the test cell. In Table 5, the first column denotes the cells storage time in days at 72° C., the second column denotes the TMV of the control cell (as measured at room temperature), the third column denotes the of the test cell (as measured at room temperature), and the fourth column denotes the calculated value of the TMV of the test cell divided by the TMV of the control cell.

TABLE 5

| Storage Time (days at 72° C.) | TMV of control cell) (volt) | TMV of Test cell (volt) | $TMV_{Test\ Cell}/TMV_{control\ cell}$ |
|---|---|---|---|
| 3 | 2.85 | 3.20 | 1.123 |
| 7 | 2.57 | 3.04 | 1.183 |
| 14 | 1.94 | 2.88 | 1.485 |
| 30 | 0.91 | 2.65 | 2.912 |
| 60 | 0.44 | 2.52 | 5.73 |
| 183 | 0.28 | 2.44 | 8.71 |

From table 5 it may be seen that for both the test cell and the control cell, the measured TMV decreases as the storage time increases. However, the rate of TMV value decline of the control cell is much faster than the rate of TMV decline for the test cell. For example, after 60 days of storage at 72° C., the TMV of the control cell was reduced by about 21% from its value measured after storage at 3 days at 72° C., while the test cell TMV declined by 84.6% from its value measured after storage at 3 days at 72° C.

Furthermore, it may be seen that even after 3 days of storage the TMV value of the test cell is larger by about 12% than the TMV of the control cell. After prolonged storage periods at 72° C., the TMV of the test cell was much higher than the TMV of the control cell. For example, after 30 days of storage at 72° C., the TMV value of the test cell is larger by about 290% than the TMV of the control cell and after 60 days of storage at 72° C., the TMV value of the test cell is larger by about 572% than the TMV of the control cell.

Example 9

An AA size cell similar to the cell described in example 2 above was constructed, except that the concentration of the $SnCl_2$ additive in the electrolyte solution was 5.0 gr/liter of electrolyte solution instead of 2 gr/l as in example 2. The cell's AC impedance at 1000 Hz measured after 20 days of storage at room temperature (about 21° C.) was 3.8 ohm in comparison to 4.1 ohm for the test cell of example 2 and 8.8 ohm of the control (prior art) cell described in example 1. Upon discharge of the cell of example 9 at a constant current of 20 mA further improvement in cell capacity was observed.

The discharge capacity of the cell of example 9 (with 5.0 gr/L $SnCl_2$) was 2.48 Ah in comparison to a discharge capacity of 2.42 Ah for the test cell of example 2 (with 2.0 g/liter $SnCl_2$) as compared to a discharge capacity of 2.18 Ah for the control cell of example 1 (that did not include any $SnCl_2$ additive in the electrolyte solution).

It is apparent from the results presented hereinabove that a very substantial decrease in cell impedance and increase in TMV value occurs at prolonged storage periods (at room temperature and at an elevated temperature of 72° C.). This indicates a substantial performance improvement of the primary test cells of the present invention as compared to prior art (control) primary cells. The test cells of the present invention will allow substantially higher currents to be drawn from the test cells as compared to the prior art (control) cells (under the same load) even after long storage time periods, due to the substantially lower cell impedance and to the higher voltages developed as compared to the control (prior art) primary cells.

A further improvement in the Test cell's performance is the higher charge capacity under relatively high discharging currents, as demonstrated in examples 6 and 7 above, which showed a 11% increase in the test cell charge capacity as compared to the control cell charge capacity (measured at 20 mA current to a cutoff of 2.0V).

As demonstrated above, the electrical performance of the tested AA and D cells containing the $SnCl_2$ additive in the electrolyte solution of the cell is significantly better than the prior art $Li/SOCl_2$ primary cells. The cell's initial operating voltage and electrical capacity at a high discharge current are both significantly improved as compared to the corresponding prior art (control) cells. The TMV values at room temperature and after storage at elevated temperatures of cells of the present invention are found to be much better (higher) than the corresponding control (prior art) $Li/SOCl_2$ primary cells. Extended periods of storage at 72° C. showed an increase larger than 5 fold in the measured TMV for the test cells as compared to the control cells.

AC impedance measurement as a function of storage time clearly reveals a much higher electrical conductivity (lowered cell impedance) for the cells of this invention as compared to prior art $Li/SOCl_2$ primary cells both at room temperature (about 21° C.) and at an elevated temperature (of 72° C.), indicative of long term storage stability of the improvement in the cell's impedance.

It is noted that although the experimental cells described in EXAMPLES 1-9 above were constructed as a "bobbin type" (for the AA Sized cell ER 14500) and as a "ER 33600" type cell, this is not obligatory to practicing the invention and any other suitable type of cell structure may be used to implement the cells of the present invention. For example, spiral cells, button type cells, coin type cells, wafer type cells (such as, for example, 2450 wafer cells), prismatic type cells, C size cells, AA/2 cells, or any other cell type or cell structure type suitable for primary Li/SOCl$_2$ cells. All such primary lithium cell types may be used in constructing the cells of the present invention and are included within the scope of the primary lithium cells of the present invention. Any other type of cell construction and/or any size of such cells may be used as long as it is compatible with the cell's ingredients.

Concentration of Electrolyte

Prior art Li/SOCl$_2$ primary cells may use various concentrations of salt (electrolyte) in the SOCl$_2$ cathodic liquid material ranging from about 0.6M to about 1.4M LiAlCl$_4$. The conductivity of the electrolyte solution increases with the salt concentration. At room temperature, the peak in electrolyte conductivity is around 1.8M LiAlCl$_4$. However, for 1.8M LiAlCl$_4$ the electrolyte solution becomes very viscous at lower temperatures leading to decrease in conductivity. Therefore, a more typical range of concentration of LiAlCl$_4$ used in commercial primary Li/SOCl$_2$ cells is 1.2M-1.4M. At high operation temperatures, for example 150° C., typical in some oil drilling applications, high concentrations of LiAlCl$_4$ improve cell electrical capacity and cell voltage at given currents. However, lower salt (electrolyte) concentrations may also be used in the cells of the present invention.

The salt concentrations (such as, for example, LiAlCl$_4$ or LiGaCl$_4$) in the Li/SOCl$_2$ cells with SnCl$_2$ additive of the present invention may typically be between about 0.4M to about 1.4M, depending, inter alia, on the cell's intended use and required operating temperature range.

It is noted that while the carbonaceous material used in the cathode current collector of examples 1-9 above was acetylene black bonded by PTFE, this is not obligatory for implementing the cells of the present invention and other types of porous carbonaceous materials may also be used, such as, for example, graphite or high surface area carbon like black pearl 2000, or any combinations or mixtures of any of the above materials. bonded by PTFE or by any other chemically suitable bonding materials.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A primary electrochemical cell comprising:
a cell housing;
an anode comprising metallic lithium disposed within the housing;
a cathode disposed within the housing, the cathode comprises a current collector comprising a porous carbonaceous material, an SOCl$_2$ liquid cathode material, a salt of a Lewis base with a Lewis acid dissolved in the SOCl$_2$ to form an electrolyte solution, and an amount of SnCl$_2$ additive dissolved in the electrolyte solution; and
a separator separating the anode from the cathode.

2. The primary cell according to claim 1, wherein the porous carbonaceous material comprises a bonded porous carbonaceous material.

3. The primary cell according to claim 1, wherein the salt of the Lewis base and the Lewis acid is selected from LiAlCl4, LiGaCl$_4$, and any combinations thereof.

4. The primary cell according to claim 1, wherein a concentration of the salt of the Lewis base with a Lewis acid is in the range of 0.4-1.8M.

5. The primary cell according to claim 1, wherein the separator is a glass fiber separator.

6. The primary cell according to claim 1, wherein the housing is a hermetically sealable stainless steel housing or a nickel plated steel housing.

7. The primary cell according to claim 1, wherein the amount of SnCl$_2$ additive is in the range of 0.5-5.0 grams of SnCl$_2$ per liter of the electrolyte solution.

8. The primary cell according to claim 1, wherein the cell is selected from a bobbin type cell, a button type cell, a prismatic cell, a spiral cell, a wafer type cell, a coin type cell, an ER14500 cell, a ER33600 cell, an AA size cell, a C type cell and a D type cell.

9. The primary cell according to claim 1, wherein the SnCl$_2$ additive causes an improvement in one of more electrical parameters of the cell.

10. The primary cell according to claim 9, wherein the improvement is selected from,
increasing a transient minimum voltage (TMV) of the primary cell at a pulse current of C/60 by 10% or higher,
decreasing the cell's AC impedance measured at 1 KHz at a temperature of 21° C. by 20% or higher,
exhibiting less than 60% increase in the cell's AC impedance measured at 1 KHz after cell storage of 332 days at 21° C.,
increasing the cell's electrical charge capacity by at least 10%, wherein the charge capacity is determined by discharging the cell at a current of 20 mA to a cutoff voltage of 2.0 volts, and
any non-mutually exclusive combinations thereof.

11. A method of constructing the primary cell of claim 1, the method comprises the steps of:
providing a cell housing comprising a metallic can and a metallic cell cover including a positive terminal electrically isolated from the metallic cover by a glass/metal seal,
providing an anode comprising metallic lithium,
providing a liquid cathode material comprising SOCl$_2$, a salt of a Lewis base with a Lewis acid dissolved in the SOCl$_2$ to form an electrolyte solution, and an amount of SnCl$_2$ additive dissolved in the electrolyte solution,
providing a cathode current collector including a porous carbonaceous material,
providing a separator,
inserting the lithium metal, the separator and the current collector into the can such that the separator electrically separates the metallic lithium and the metallic can from the current collector, inserting the positive terminal into the can such that the positive terminal or part thereof is in contact with the current collector, welding the metallic cover to the metallic can, filling the housing with the liquid cathode material, and hermetically sealing the housing.

12. The method according to claim 11, wherein the step of filling comprises introducing the liquid cathode material into the housing through a hole formed in the can prior to the step of hermetically sealing the housing.

13. The method according to claim 11, wherein the first step of providing, the second step of providing, the third step of providing, the fourth step of providing and the fifth step of providing are performed in the order specified in claim 11.

14. The method according to claim 11, wherein at least the first step of inserting, the second step of inserting, the step of filling and the step of hermetically sealing are performed in an atmosphere comprising dry air.

\* \* \* \* \*